RHODES & REED.
Velocipede.

No. 102,322.  Patented April 26, 1870.

WITNESSES
Thomas J. Bewley
Samuel H. Runner

INVENTORS
Joel H. Rhodes
William Reed
By their Attorney
Stephen Ustick

United States Patent Office.

JOEL H. RHODES AND WILLIAM REED, OF PHILADELPHIA, PENNSYLVANIA.

Letters Patent No. 102,322, dated April 26, 1870.

IMPROVED VELOCIPEDE.

The Schedule referred to in these Letters Patent and making part of the same.

We, JOEL H. RHODES, M. D., and WILLIAM REED, of the city of Philadelphia and State of Pennsylvania, have invented certain Improvements in Velocipedes, of which the following is a specification.

The nature of our invention, in the first place, consists in the construction of a figure of a horse or other animal, which serves as a seat for the rider, with a cavity throughout its whole length, and arranging therein the front wheel and the steering apparatus, as hereinafter described.

It also consists of a steering-device, combined and arranged in the horse and hind axle, as hereinafter described.

It further consists of a horizontal curve of the hind able, through which the king-bolt passes, to take the strain off the axle in the tendency of the wheels to turn the axle around, and also to steady the running of the wheels.

To enable others skilled in the art to which our improvement appertains to make and use our invention, we will now describe the construction and operation.

In the accompanying drawings which make a part of this specification—

Figure 1:
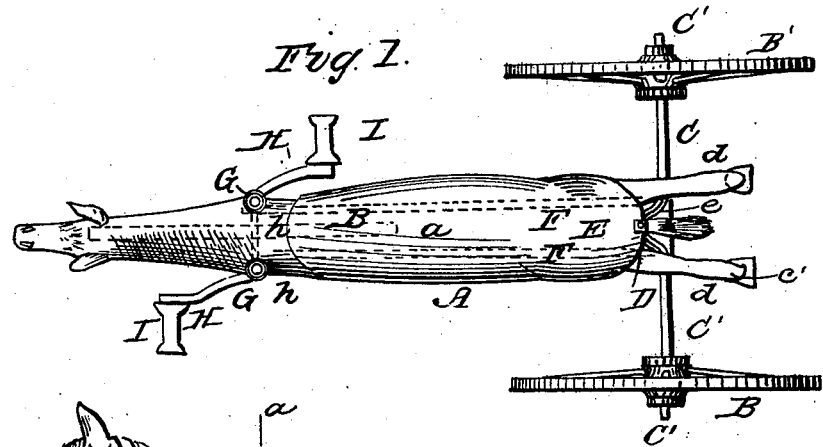
Figure 2:
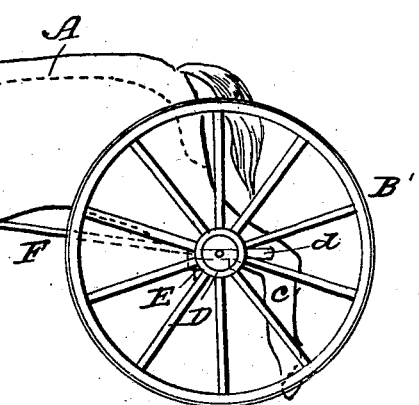
Figure 3:
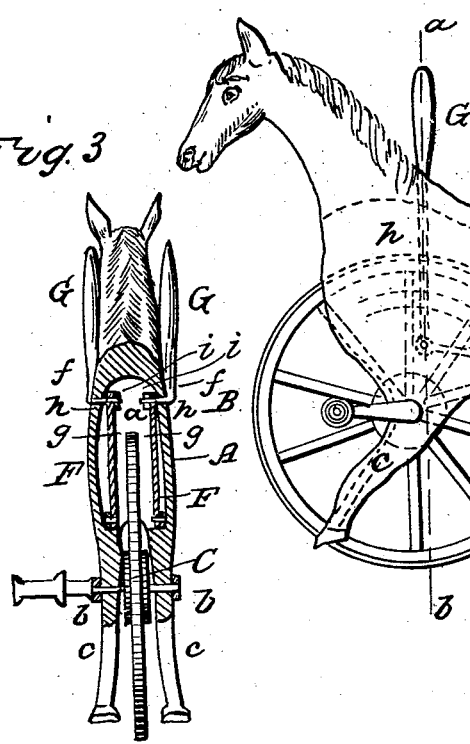

Figure 1 is a plan of the improved velocipede.
Figure 2 is a side elevation of the same.
Figure 3 is a cross-section at the line $a\ b$ of fig. 2.

Like letters in all the figures indicate the same parts.

A is the figure of a horse, which has a longitudinal cavity, $a$, which receives the front wheel B and the device hereinafter described.

The journals $b\ b$ of the axle C of the wheel B turn in the front legs $c\ c$ of the horse, so as to sustain the front part of the latter.

The hind part of the horse is sustained by the axle C', on which the hind wheels B' B' are situated, there being horizontal slots $d\ d$ in the hind legs $c'\ c'$, which receive them and allow a swivel motion of the axle, the latter being connected with the cross fixed bar D by means of the king-bolt E, as seen in fig. 1.

We construct the axle C' with a curve, $e$, through which the king-bolt passes, to take the strain off the latter, in the tendency of the wheels to turn the axle around, and also to steady the running of the wheels B' B'.

There are horizontal rods F F in the cavity $a$, which have a joint connection with the hind axle C', as seen in fig. 1, and with the vertical steering-levers G G.

Each lever has a turn, $f$, that forms the fulcrum, and a vertical part, $g$, that is made separate, for convenience in attaching to the lever, the fulcrum $f$ being passed through the shoulder $h$, and the part $g$ being confined thereon by means of the nut $i$, as seen in fig. 3.

H H are cranks on the axle C, which are provided with treadles or foot-rests I I, for the purpose of propelling the velocipede.

We do not claim, broadly, a cavity in the body of a horse, as that is partially shown in the patent of P. W. McKenzie, dated January 19, 1864.

When it is desired to dispense with an animal by substituting any other form of seat, the connection of the levers G G may be made in a similar manner, as above described.

What we claim as new, and desire to secure by Letters Patent, is—

1. The cavity $a$, throughout the whole length of the figure of a horse or other animal, and the arrangement therein of the wheel B and steering apparatus, substantially as described.

2. The combination of the steering-levers G G and rods F F with the horse A and axle C', as above set forth.

3. The construction of the axle C', with a curve, $e$, arranged in relation to the fixed bar D, as and for the purpose specified.

In testimony that the above is our invention, we have hereunto set our hands and affixed our seals this 20th day of January, 1870.

JOEL H. RHODES, M. D. [L. S.]
WM. REED. [L. S.]

Witnesses:
THOMAS J. BEWLEY,
STEPHEN USTICK.